Patented Apr. 23, 1935

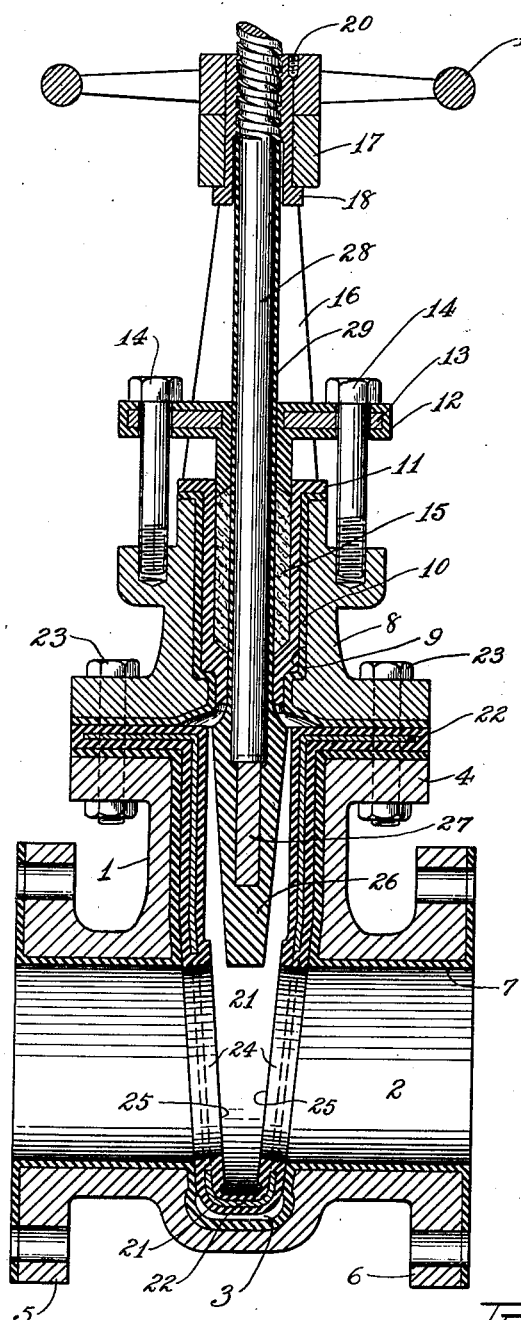

1,998,882

UNITED STATES PATENT OFFICE 1,998,882

VALVE FOR CORROSIVE FLUIDS

Allan B. Merrill, Akron, Ohio, assignor to The B. F. Goodrich Company, New York, N. Y., a corporation of New York Application February 4, 1932, Serial No. 590,799

4 Claims. (Cl. 251—59)

This invention relates to valves, and especially gate valves, for regulating the flow of corrosive fluids.

The principal objects of the invention are to provide a valve of the corrosion resistant type in which the operating parts are efficiently protected, one in which the valve gate and its seats may be readily replaced, and one which will not obstruct the flow of fluid irrespective of the pressure of the fluid.

Other objects will appear from the following description and the accompanying drawing.

The accompanying drawing is a longitudinal section of a valve embodying my invention in its preferred form, part of the stem being broken away.

Referring to the drawing, the numeral 1 designates the valve body, which is formed with a fluid conduit 2 intersected by a narrow gate cavity 3. The valve body is provided with a flange 4 at the top of the gate-cavity and with flanges 5 and 6 at the ends of the conduit.

A corrosion-resistant lining 7 extends continuously over the inner faces of the gate cavity and fluid conduit and over the faces of the flanges 4, 5 and 6. This lining is preferably made of soft rubber vulcanized or cemented to the rigid body, but may be of any corrosion resistant material.

A bonnet 8, flanged on its lower end for attachment to flange 4 of the valve body and counterbored to provide a gland cavity 9, is also provided with a corrosion resistant lining 10, preferably of soft rubber, which is flanged out over its upper and lower faces. A stuffing box bushing 11 of hard rubber is located in the gland cavity and a hard rubber gland 12 is provided with a flange reinforced by an enclosed metal plate 13, and adjusted by screws 14, holds the packing 15 under compression.

A U-shaped bracket 16, is provided with a bearing 17 in line with the bore of the bonnet 8 and an internally threaded externally smooth bushing 18, having a flange at one end, is journaled in the bearing. The other end of the bushing is fastened to a hand wheel 19 by a screw 20.

Removably mounted in the gate-cavity 3 is a gate-pocket 21 comprising a sheet metal or other reinforcement 22 covered with hard rubber or other resilient corrosion-resistant material, the lower part of the pocket being wedge-shaped to conform to the lining in the cavity 3, and the upper portion being flanged to extend between the valve body flange 4 and the bonnet where it acts as a gasket, being clamped by the bolts 23. The pocket is formed with opposite apertures 24 which align with the conduit 2 and the resilient portion is provided with raised valve seats 25 surrounding said openings.

The valve gate 26 is formed of rigid corrosion resistant material, preferably hard rubber or similar moldable material. A metal reinforcement 27 is embedded therein and is attached to a valve stem 28. The moldable material of the gate extends to enclose the stem 28 throughout a sufficient part of its length, as at 29, to insure protection of the stem from corrosive fluids. The stem covering 29 is preferably ground to provide a smooth true surface for engaging the packing 15.

The stem 28 is threaded along its upper part to engage the threaded bushing 18.

When the gate is closed by turning the hand wheel 19, engagement of the gate with the seats 25 not only seals the gate against the seats but laterally forces the pocket walls against the lining of the valve cavity, and the resilience of the soft rubber lining permits an effective sealing of the parts.

Should the pocket 21 become worn or damaged, bolts 23 may be removed, the bonnet lifted, and the pocket withdrawn and replaced without taking down the pipe line. The pocket may be cemented in place if desired, but this is not necessary.

I claim:

1. A removable gate pocket adapted to fit a cavity in a valve, said pocket comprising a tapered reinforcing shell and a corrosion resistant covering therefor, said pocket being provided with fluid apertures, the covering being provided with fluid apertures, and the covering being thickened around said apertures to provide valve seats.

2. A gate valve for use with corrosive fluids, said valve comprising a valve body, a bonnet and a sliding gate, each provided with corrosion resistant facings, and a removable valve pocket said pocket being reinforced by a rigid insert and including a pair of opposite valve seats.

3. A gate valve for use with corrosive fluids, said valve comprising a valve body, a bonnet, and a sliding gate, each provided with corrosion resistant facings, and a removable valve pocket, said pocket including a flanged wedge-shaped hollow body of metal, fluid apertures therein, a corrosion resistant rubber lining over said body of metal, and resilient opposite valve seats around said apertures.

4. A gate valve comprising a valve body formed with a fluid passage and a gate cavity intersecting said passage, a continuous resilient lining extending over the walls of the fluid passage and of said gate cavity, and a removable gate pocket provided with a rigid reinforcement and seated in said gate cavity in engagement with said lining.

ALLAN B. MERRILL.